July 1, 1958     A. K. KOCH     2,840,917
TOOLMAKERS INDICATORS
Filed June 2, 1955     2 Sheets-Sheet 1
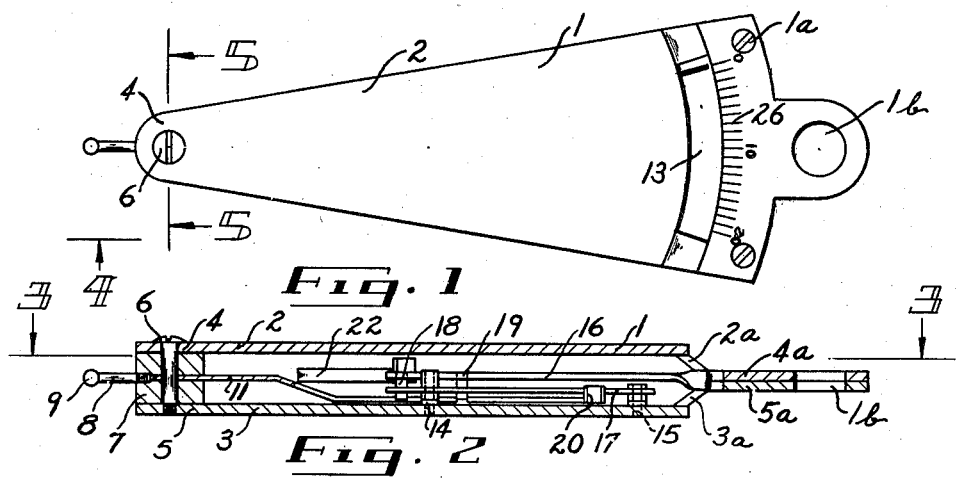
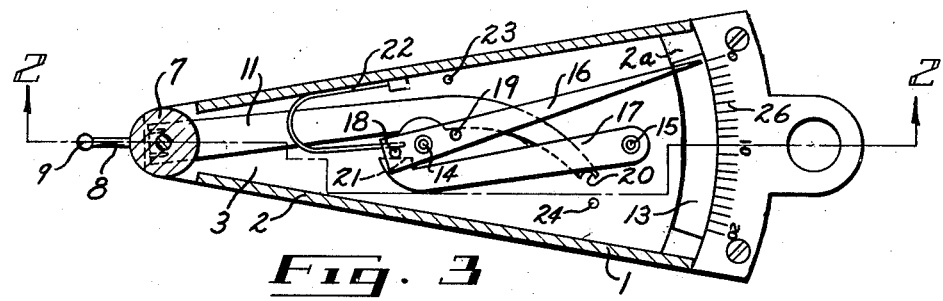
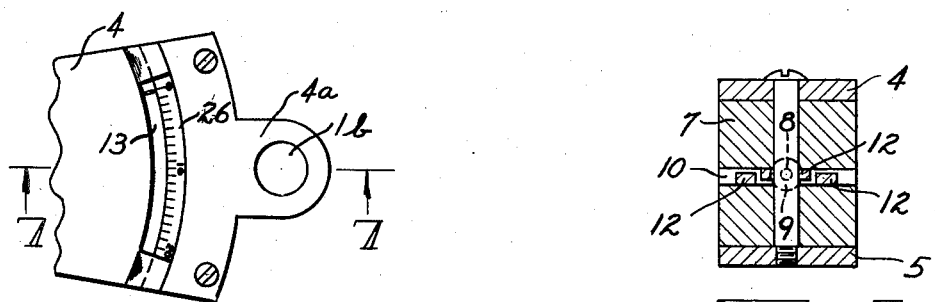
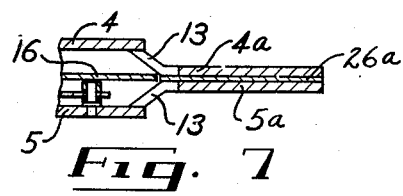
INVENTOR.
August K. Koch
BY
Gerald Baldwin
Attorney July 1, 1958  A. K. KOCH  2,840,917
TOOLMAKERS INDICATORS
Filed June 2, 1955   2 Sheets-Sheet 2
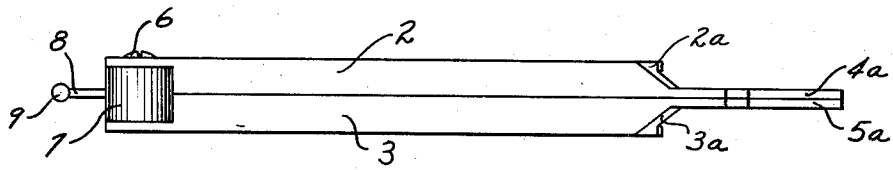
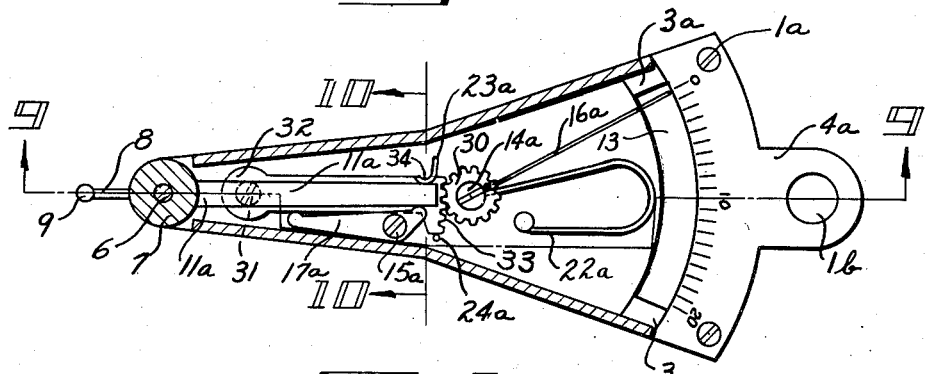
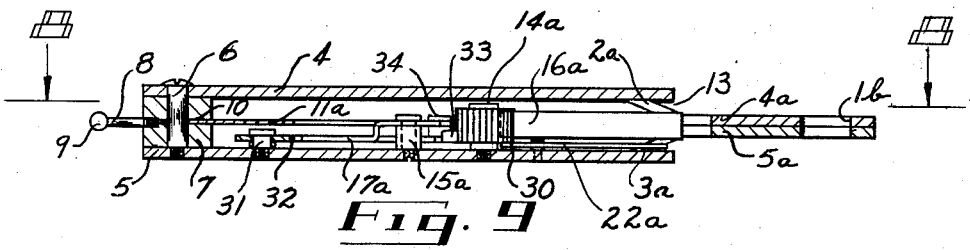
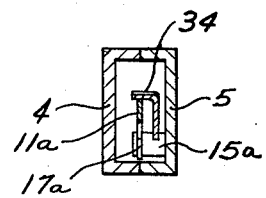
INVENTOR.
August K. Koch
BY
Gerald F. Baldwin
Attorney – # United States Patent Office 2,840,917
Patented July 1, 1958

2,840,917

TOOLMAKERS INDICATORS

August K. Koch, Detroit, Mich.

Application June 2, 1955, Serial No. 512,622

3 Claims. (Cl. 33—172)

This invention relates to improvements in toolmakers indicators, and refers particularly to indicators wherein means are provided for moving a needle or pointer in the same direction across a scale irrespective of the direction of movement of a pivoted contact member by which the needle is actuated.

It is an object of the invention to provide such a toolmakers indicator wherein movement of the contact member in one direction through a given angular distance imparts materially greater angular movement to the needle than is imparted to the latter upon movement of the said member through the same angular distance in the opposite direction. Thus each graduation of the scale may denote thousandths of an inch when the contact member is moved in one direction, and ten-thousandths of an inch when the said member is moved in the opposite direction.

A further object of the invention is to provide such an indicator wherein each side of the scale is substantially in alignment with one side of the needle or pointer so that accurate readings may easily be obtained from either side of the indicator.

Yet another object of the invention is to provide a toolmakers indicator wherein the device is so constructed that it is simple and easy to manufacture and assemble, and wherein the needle is protected within the body of the device.

With these and other objects and advantages in view which will become apparent as the specification proceeds, the invention is hereinafter more fully described with the aid of the accompanying drawings, in which:

Figure 1 is a view showing one side of the invention.
Figure 2 is a section on the line 2—2 of Figure 3, and
Figure 3 is a section on the line 3—3 of Figure 2.
Figure 4 is an elevation on the line 4—4 of Figure 1.
Figure 5 is a section on the line 5—5 of Figure 1.
Figure 6 is a detail showing a modified arrangement of the scale and needle or pointer.
Figure 7 is a section on the line 7—7 of Figure 6.
Figure 8 is a sectional view similar to that in Figure 3 but showing a modified arrangement of the mechanism for actuating the needle.
Figures 9 and 10 are sections on the lines 9—9 and 10—10, respectively, of Figure 8.

Referring to the drawings, 1 designates a housing which in the present instance consists of two similar sections 2 and 3 each of which intermediately of its length is channel-shaped in cross section. At one extremity the flanges of both sections are removed thereby leaving two spaced parallel walls 4 and 5. Mounted in and extending between the walls 4 and 5 is a pin 6 by which, in the present instance, the walls are also held in spaced relation. Supported on the pin 6 between the walls 4 and 5 is a rotary member 7, and projecting radially from the rotary member is a rod 8 having a suitable contact member 9 on its outer extremity for engaging a workpiece—not shown. Formed in the rotary member 7 intermediately of its length is a radial slot 10 into which one extremity of an arm 11 extends. The arm 11 is apertured for the passage of the pin 6 therethrough and is also longitudinally split from its apertured extremity to form a plurality of fingers 12 which are alternately sprung in laterally opposite directions to prevent accidental radial movement of the arm relative to the rotary member. Outwardly toward the opposite end of the housing 1 the central portions of the sections 2 and 3 are inwardly inclined toward one another as shown at 2a and 3a, there the flanges of the sections are of decreasing width, and the extremities 4a and 5a of the said central portions lie parallel and contiguous on one another and are held together as by screws 1a. Extending through both extremities 4a and 5a is an opening 1b for the passage of suitable mounting means to support the indicator on a machine. Opposed apertures 13 are formed through the inclined central portions 2a and 3a of the housing throughout the major portions of their length and width.

Referring now more particularly to Figures 1 to 7, inclusive, mounted in the housing 1 parallel with the axis of the rotary member 7 are two pivot pins 14 and 15 on which a needle or pointer 16 and a lever 17, respectively, are mounted. Extending laterally from the needle 16 on opposite sides of and preferably equidistant from its axis are two contact pins 18 and 19. The arm 11 is curved toward its outer extremity to extend across the needle 16 and lever 17. Projecting laterally from the arm at its outer extremity is a lug 20, which, when the rotary member 7 and arm 11 are turned in an anti-clockwise direction (Figure 3), engages the lever 17 and turns it clockwise so that the offset outer extremity 21 of the lever moves the pin 18 and turns the pointer clockwise; when the arm 11 is turned clockwise it moves the pin 19 and again causes the needle to move clockwise. Thus irrespective of the direction in which the arm 11 is turned it imparts movement in the same direction to the needle 16. However it will be readily seen that the distance from the axis of the rotary member 7 to the lug 20 is materially greater than from the said axis to the point of contact of the arm 11 with the pin 19, and also that when the arm 11 is turned in an anti-clockwise direction (Figure 3) the movement of the needle 16 is again increased by the lever 17 due to the fact that the pin 18 is materially farther from the axis of the lever than the lug 20. Therefore considerably greater angular movement of the needle 16 results when the arm 11 is turned anti-clockwise than when the said arm is moved through the same distance in a clockwise direction.

I usually proportion the arm, lever and needle and their respective points of contact with one another so that when the arm is turned in one direction the needle is turned ten times the angular distance it travels through when the arm is rotated the same angular distance in the opposite direction. Secured to one side of the housing 1 is a spring 22 which bears against the contact pin 18 and tends to turn the needle in an anti-clockwise direction and at the same time tends to force the lever anti-clockwise so that one side of the latter is in contact with the lug 20. Suitable stops 23 and 24 are also secured to the housing 1 for limiting the movement of the arm 11 in each direction so that the needle cannot be moved far enough in either direction to be damaged against either side of the housing.

A scale 26 is provided on each side of the housing 1 for cooperation with the needle 16. In Figures 2, 3 and 8 the scales 26 consist of a plurality of graduations etched or otherwise shown on the outer faces of the housing extremities 4a and 5a and extend outwardly from the aperture 13 radially from the axis of the needle 16. In this case the outer extremity of the needle is the same thickness as the combined thickness of the two housing extremities 4a and 5a so that each side of the needle is in alignment with one set of graduations, and the outer face of the aperture 13 is coaxial with the needle and spaced outwardly a very slight distance therefrom. By this arrangement very accurate readings may be easily obtained from either side of the indicator particularly since the outer extremity of the needle is quite narrow and extends only a fraction of the distance between adjacent pairs of graduations.

In the modification shown in Figures 6 and 7 a plate 26a is secured between the housing extremities 4a and 5a. This plate 26a projects inwardly into the aperture 13 and its inner edge face is coaxial with the needle 16 and is spaced outwardly a short distance therefrom. Suitable graduated scales 26b are etched or otherwise marked upon the plate 26a on opposite sides thereof from its inner margin and radial to the axis of the needle. In this case again the thickness of the pointer or needle is the same as the thickness of the plate 26a and each side of the needle is in alignment with one side of the plate to permit easy and accurate reading.

In the modification shown in Figures 8 through 10, the needle is actuated not by levers alone but by a combination of levers and gearing. The arm 11a is mounted as before for rotary movement with the member 7. A lever 17a pivoted on a pin 15a is adapted to be moved about its axis by the arm 11a when the latter is turned in a clockwise direction, Figure 8. Mounted on a pin 14a, parallel with the pin 15a and the rotary member 7 and supported also by the housing 1, is a gear 30 radially from which a pointer 16a extends. Supported for rotary movement on a pin 31 extending from the housing 1 is an intermediate pivoted member 32 having a segmental rack 33 on its outer extremity which meshes with the gear 30. The lever 17a is laterally offset intermediately of its length and while one extremity thereof is in alignment with the arm 11a its opposite extremity is in alignment with the intermediate member 32 so that upon clockwise movement—Figure 8—of the arm 11a the member 32 is turned in an anti-clockwise direction by the lever 17a, thereby turning the gear 30 and the needle 16a clockwise. Extending laterally from the intermediate pivoted member 32 adjacent its outer extremity is a lug 34 which is adapted to be engaged by the arm 11a upon movement of the latter in an anti-clockwise direction and imparting movement in the same direction to the member 32 whereby the needle is turned clockwise. Thus again rotation of the arm 11a in either direction moves the needle clockwise. However due to the pivotal arrangement of the arm 11a, lever 17a and the member 32 the angular distance through which the needle is turned is considerably greater, usually ten times greater, when the arm is moved in a clockwise direction than when it is moved through the same angular distance in an anti-clockwise direction.

A spring 22a secured at one extremity to the housing 1 is employed for tending to rotate the gear 30 in an anti-clockwise direction to maintain the needle opposite the zero mark of the graduations. Extending from the housing is a stop 24a which is adapted to contact the segmental rack 33 and limit the movement of the needle so that it cannot travel in an anti-clockwise direction—Figure 8—past the zero marks of the scales. A second stop is provided for limiting the movement of the needle in a clockwise direction, and consists in the present instance of a projection 23a on the lug 34 which is adapted to strike one side of the housing.

From the foregoing it will be seen that the spacing of the graduations of the scales is sufficient to afford very accurate readings and that each graduation may indicate movement of the contact member 9 through one thousandth of an inch when the said member is moved in one direction and one ten-thousandth of an inch when the member is moved in the opposite direction. It will also be noted that by the construction shown the needle is well protected throughout its length, and that quick and easy assembly may be had by mounting all the pins 14, 15, or 14a, 15a and 31, on one of the housing portions, in the case shown in portion 3.

While in the foregoing the preferred embodiments of the invention have been described and shown, it is understood that further alterations and modifications may be made thereto provided they fall within the scope of the appended claims.

What I claim is:

1. A dual range toolmakers indicator including a housing, an arm pivoted thereon, a contact member projecting from the housing and mounted for movement with the arm about the axis thereof, a graduated scale on the housing, a needle pivoted on the housing for movement across the scale, means in the housing coacting with the arm and needle for turning said needle across the scale when the arm is turned in one direction, and other pivoted means on the housing interposed between the arm and the needle whereby when the arm is turned through the same angular distance in the opposite direction the needle is turned through a different angular distance so that the scale is adapted to read in ten-thousandths of an inch when the arm is turned in one direction and thousandths of an inch when said arm is turned in the opposite direction.

2. A dual range toolmakers indicator comprising a housing having an arm pivoted thereon, a contact member projecting from the housing and mounted for movement with the arm about the axis thereof, a graduated scale on the housing, a needle pivoted on the housing for movement across the graduated scale, an intermediate member pivoted on the housing, coacting means on the arm and intermediate member for turning said member when the arm is turned in one direction, coacting means on the needle and intermediate member whereby one of them is moved by rotation in either direction of the other, a lever pivoted on the housing adapted to be moved by the arm when said arm is turned in the other direction, said lever being adapted to move the intermediate member, and the distances of the respective axes of the arm, intermediate member and lever from the contact faces thereon being such that by the same angular movement of the arm but in opposite directions the needle is moved different angular distances across the scale, whereby said scale is adapted to read either in thousandths or ten-thousandths of an inch according to the direction in which the arm is turned.

3. A dual range toolmakers indicator including a housing having an arm pivoted thereon, a contact member projecting from the housing and mounted for movement with the arm about the axis thereof, an intermediate member pivoted in the housing and having a segmental rack thereon, a projection on the intermediate member adapted to be engaged by the arm when said arm is turned in one direction to turn said member, a gear mounted for rotation on the housing meshing with the rack, a graduated scale on the housing, a needle secured to the gear and projecting therefrom for registry with the graduated scale, a lever pivoted in the housing for coaction with the arm when said arm is turned in the other direction, said lever being adapted to turn the intermediate member, and the distances from the respective axes of the arm, intermediate member and lever to their contact faces with one another being such that by the same angular movement of the arm in said other direction the needle is moved through a materially greater distance than when said arm is moved in the first named direction, whereby the scale is adapted to be read either in ten-thousandths or thousandths of an inch according to the direction in which said arm is turned.

References Cited in the file of this patent

UNITED STATES PATENTS

| | | |
|---|---|---|
| 1,399,314 | Nicholson | Dec. 6, 1921 |
| 1,400,436 | Heil et al. | Dec. 13, 1921 |
| 1,668,857 | Mackey | May 8, 1928 |